Nov. 23, 1971  H. H. ANDREWS ET AL  3,621,537
FASTENER FOR NON-WOVEN FABRICS
Filed Dec. 10, 1969
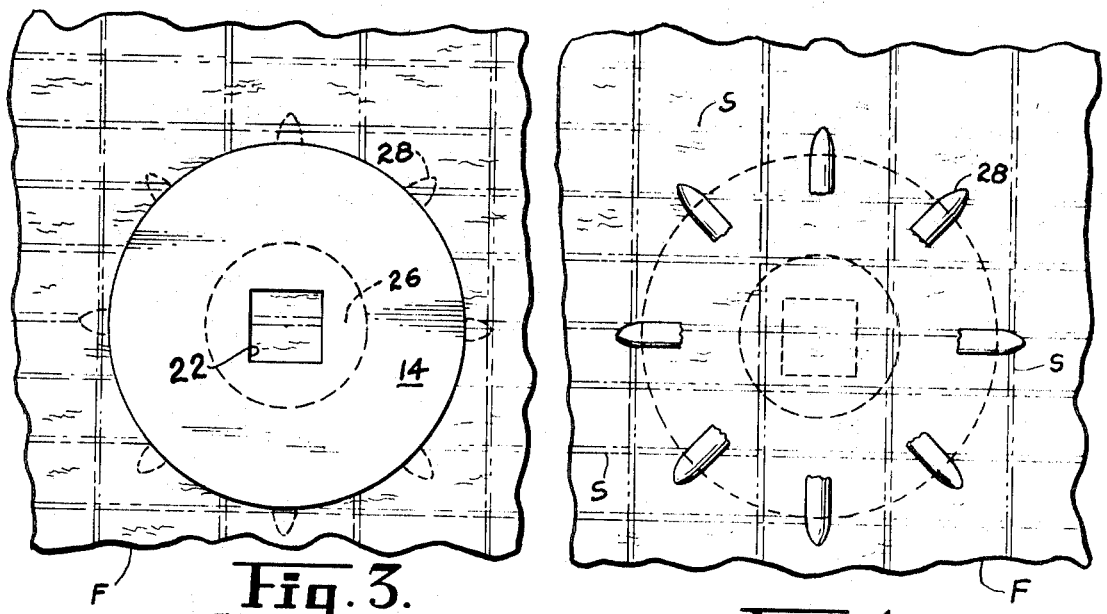
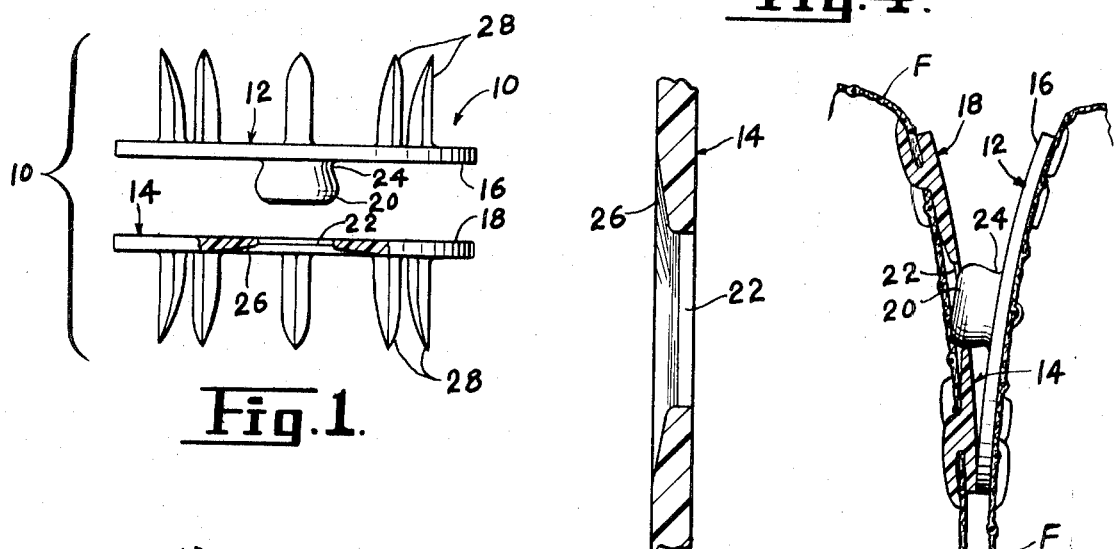
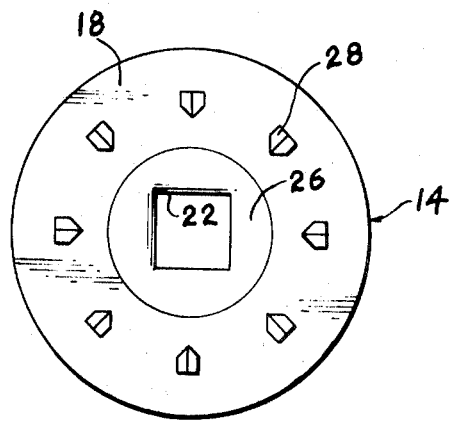
INVENTORS
Hugh H. Andrews
Kenneth W. Flisher
Donald O. Taylor
BY Dallett Hoopes
ATTORNEY

United States Patent Office 3,621,537
Patented Nov. 23, 1971

3,621,537
FASTENER FOR NON-WOVEN FABRICS
Hugh Hill Andrews, Cheshire, Kenneth W. Flisher, Middlebury, and Donald O. Taylor, Waterbury, Conn., assignors to Scovill Manufacturing Company, Waterbury, Conn.
Filed Dec. 10, 1969, Ser. No. 883,693
Int. Cl. A44b *17/00*
U.S. Cl. 24—216
3 Claims

ABSTRACT OF THE DISCLOSURE

A plastic snap fastener for non-woven fabrics having thin flexible base flanges and integral setting prongs which in use are rolled outward or collapsed to clamp the fastener parts to the scrim of the non-woven fabric.

---

This invention relates to a plastic snap fastener. More specifically, this invention relates to a fastener especially adapted for use with non-woven fabrics, and more particularly, as a closure for disposable garments.

In the past, snap fasteners have usually been of metal or heavy gauge plastic and have been rigidly attached to non-woven fabrics by means of a backing plate which clamped the fabric against the base flange of the stud and socket parts. This rigid assembly has placed great strain on the non-woven fabric at the edges of the closure and frequently the fabric, being relatively weak, has torn at the edges of the fastener units at the time of the disengagement of the fastener which is conveniently done by pulling the fabric. The strain put on the fabric during disengagement has been amplified by the usually stiff off-action of the fasteners in the prior art.

The expense of prior plastic fasteners used on non-woven material has hampered their marketability. The plastic fasteners, which should be less expensive than the metal ones, have required a backing plate, increasing substantially the amount of plastic and mold expenditures for a single fastener, thereby making them comparable in cost to the metal.

It is an object of the present invention to provide a plastic fastener not requiring a backing plate and having a flexible base flange to absorb part of the stress normally concentrated on the non-woven fabric at the edges of the fastener in prior devices.

It is a further object of the invention to provide a plastic fastener which needs no backing plate and yet which is sufficiently anchored to the relatively weak non-woven fabric so as to permit disengagement by the convenient pulling of the fabric layers at the garment closure.

A further object of the invention is to provide a fastener which may be readily molded and which is relatively insensitive to variation in plastic mold materials from one batch to the next. It provides a uniform action featuring a crisp, snapping, relatively hard, on-action and a relatively soft off-action.

Other objects of the invention will be apparent to those skilled in the art after reading the following specification and examining the drawings wherein:

FIG. 1 is a side view of two mating elements embodying the invention;

FIG. 2 is a bottom plan view of the female element;

FIG. 3 is a top plan view of the female element applied to a non-woven fabric;

FIG. 4 is a bottom plan view of the FIG. 3 representation;

FIG. 5 is a side view of an assembly partly in section and illustrating the flexibility of the fastener embodying the invention during disengagement; and FIG. 6 is a fragmentary enlargement of across section through the socket opening.

Referring more specifically to the drawings, FIG. 1 shows an assembly embodying the invention and generally designated 10. It comprises a male half or element 12 and a female half or element 14. Each comprises a circular base flange 16 and 18 respectively. At the center of each base flange are the respective stud head 20 and socket mouth 22. The stud head, as shown, has a reduced neck 24 and the socket mouth (FIG. 2) is preferably of square shape so that varying dimensions in the opening are not as critical as they would be if the opening were circular. As shown, the underside of the opening is provided with a chamfer 26 (FIG. 6) and a rounded edge. This eases or softens the off-action. At the same time, the sharp corner at the face side of the opening provide a crisp on-action.

The underside of each base flange 16 is provided with a plurality of integral prongs 28 arranged in a large circle concentric with the base flange. Each prong is, as shown, tapered toward its distal end and formed of generally triangular cross section to provide a pronounced inner corner to allow the prong to be rolled or collapsed outward more readily.

As shown in FIGS. 3 and 4, the prongs in installation are pressed through the non-woven fabric F and are collapsed outwardly so that they are relatively flat against the surface of the material, clamping the fabric between the prongs and the margin of the base flange.

It is especially desirable that the attaching process be performable by cold tools. To this end, I have found that certain plastic materials give much better performance than others. In the preferred version, the material is an acetal copolymer.

As shown in FIGS. 3 and 4, the non-woven fabric, to which the invention is especially well adapted, is preferably of the type which is reinforced by a scrim of support threads or monofilaments disposed in a regular pattern and around which the non-woven fibers are formed into a unitized mat. Since the scrim threads comprise the supporting portion of the fabric, it is especially desirable that a sufficient number of prongs 28 be provided so that when they are rolled over they engage a number of scrim threads to hold the fastener half securely to the fabric. It will be understood that the engagement of the prongs and the threads may not involve actual contact but it is important that some threads are disposed in the fabric between the prongs and the base flange.

An important feature of the invention is disclosed in FIG. 5. It will be seen that the pulling apart of the fabric layers in disengagement of the snap fastener is accompanied by the flexing of the base flange. The yielding of the flange delocalizes the stresses on the fabric adjacent the prongs and margins of the snap fastener half and distributes the stress over a wider area reducing the susceptibility of the fabric to tearing at the points around the prongs and the margin of the flange when the fabric is pulled to disengage the fastener.

The flexibility of the base flange is attributable to its thinness and a physical characteristic of the plastic from which it is made. The plastic described has been found susceptible of molding with base flanges having a thickness of less than .025" and at that thinness produces a base flange of the desired flexibility.

By means of the present invention, it is possible to provide a snap fastener for non-woven fabrics having a reduced tendency to tear the fabric adjacent the fastener mounting. Both the flexibility of the base flange and the spacing of the prongs which permits the engagement of scrim threads contribute to this desirable attribute. In addition, the thinness of the base flange, made possible by the molding of the plastic described, and the rollability of the plastic prongs with cold tools provide a fastener which is readily attachable and inexpensive in that relatively small quantities of plastic are used in its manufacture.

I claim:
1. A closure assembly for
   (a) a pair of overlapping layers of non-woven, relatively weak paper-like fabric having a scrim network foundation of threads running longitudinally and transversely of the layers, a disposable garment or the like comprising
   (b) a pair of cooperant fastener halves disposed flat inbetween the layers, each molded integral and totally of a resilient plastic and comprising a wide and flexible circular base flange of a thickness no greater than about .025", the underside of the base flanges engaging the layers respectively, male and female fastening elements formed at the center of the confronting sides of the respective flanges, the elements having relatively easy off-action compared to a harder on-action, a plurality of attaching prongs extending from the underside of each of the flanges, each prong being of substantially triangular cross section with a point of the triangle disposed toward the center of the fastener half, each prong tapering in thickness toward its distal end, the prongs being arranged in a wide circle concentric with the base flange, each prong extending through the layer adjacent its base flange and bent outwardly of the fastener to clamp part of the layer between the prong and the base flange, the relation between the frequency of scrim threads and the spacing of the prongs being such that a number of threads are engaged by the prongs of each half, whereby the engagement of the prongs with the scrim threads and the flexing of the thin base flanges keep the halves from tearing the fabric thereadjacent as the layers are pulled apart to disengage the halves.

2. An assembly as described in claim 1 wherein the female fastening element is a square opening having a chamfer edge about the underside of the flange.

3. A closure fastener for fastening overlapping layers of non-woven, relatively weak paper-like fabric comprising a pair of cooperant fastener halves, each molded integral and totally of a resilient plastic and comprising a wide and flexible circular thin base flange, male and female fastening elements formed at the center of the respective flanges, the elements having relatively easy off-action compared to a harder on-action, a plurality of attaching prongs extending from the underside of each of the flanges, each prong being of substantially triangular cross section with a point of the triangle disposed toward the center of the fastener half, each prong tapering in thickness toward its distal end, the prongs being arranged in a wide circle concentric with the base flange, each prong adapted to extend through a fabric layer and adapted to be bent outwardly of the fastener to clamp part of the layer between the prong and the base flange, whereby the engagement of the prongs with such layer and the flexing of the thin base flanges keep the halves from tearing the fabric thereadjacent as the layers are pulled apart to disengage the halves.

References Cited

UNITED STATES PATENTS

| 2,546,716 | 3/1951 | Bedford, Jr. | 24—217 |
| 2,935,434 | 5/1960 | Dawson | 2—265 |
| 2,949,393 | 8/1960 | Alford et al. | 2—255 |
| 3,116,489 | 1/1964 | Weiss | 2—272 |
| 3,152,376 | 10/1964 | Boser et al. | 24—216 |
| 3,355,780 | 12/1967 | Daddona, Jr. | 24—208 A |

FOREIGN PATENTS

| 1,024,220 | 3/1966 | Great Britain | 24—208 A |

BOBBY R. GAY, Primary Examiner

G. MOORE, Assistant Examiner

U.S. Cl. X.R.

2—265; 24—208 A